United States Patent
Glassford

(10) Patent No.: US 6,436,290 B1
(45) Date of Patent: Aug. 20, 2002

(54) METHOD AND APPARATUS FOR SEPARATING MIXTURES OF ORGANIC AND AQUEOUS LIQUID PHASES

(75) Inventor: Craig L. Glassford, New Maryland (CA)

(73) Assignee: Canzone Limited, Tortola (VG)

( * ) Notice: Subject to any disclaimer, the term of this patent is extended or adjusted under 35 U.S.C. 154(b) by 0 days.

(21) Appl. No.: 09/688,112

(22) Filed: Oct. 16, 2000

(51) Int. Cl.[7] .............................................. B01D 65/00
(52) U.S. Cl. .................. 210/637; 210/137; 210/321.65; 210/416.1; 210/639; 210/650
(58) Field of Search .................................. 210/137, 175, 210/184, 198.1, 258, 259, 321.65, 321.89, 321.9, 500.23, 637, 638, 639, 650–654, 774, 799, 806, 416.1

(56) References Cited

U.S. PATENT DOCUMENTS

| | | | |
|---|---|---|---|
| 4,229,297 A | 10/1980 | Nohmi et al. ................ | 210/654 |
| RE31,087 E | 11/1982 | Sohl ............................ | 210/671 |
| 4,617,126 A | 10/1986 | Funk et al. .................. | 210/651 |
| 4,772,390 A | 9/1988 | Kawai et al. ............... | 210/433.2 |
| 4,790,941 A | 12/1988 | Taylor ........................ | 210/639 |
| 4,846,976 A * | 7/1989 | Ford ........................... | 210/651 |
| 5,207,906 A | 5/1993 | Auvil et al. ............. | 210/500.23 |
| 5,225,079 A | 7/1993 | Saito et al. ............. | 210/500.23 |
| 5,354,505 A | 10/1994 | Mendoza .................... | 252/358 |
| 5,372,723 A | 12/1994 | DeGeus et al. ............. | 210/639 |
| 5,480,553 A | 1/1996 | Yamamori et al. .......... | 610/650 |
| 5,965,015 A * | 10/1999 | Ronan et al. ............... | 210/258 |
| 6,146,535 A | 11/2000 | Sutherland .................. | 210/637 |

FOREIGN PATENT DOCUMENTS

| | | |
|---|---|---|
| CA | 2192964 | 1/1996 |
| CA | 2248280 | 10/1998 |

* cited by examiner

Primary Examiner—Joseph W. Drodge
(74) Attorney, Agent, or Firm—George A. Seaby

(57) ABSTRACT

The invention disclosed relates to a method and apparatus for separating a mixture containing an aqueous liquid and an immiscible organic phase using microporous hollow fibers. Such mixtures are separated into a substantially organic-free aqueous phase and a substantially aqueous-free organic phase. The mixture is pressurized in a controlled low shear manner to minimize emulsification as it is contacted with the fibers. Productivity is enhanced by separating as a third product stream, a further organic phase containing only small amounts of an aqueous phase, which for some applications can usefully be combined with the substantially aqueous-free organic phase. Other ways for enhancing productivity are also disclosed.

32 Claims, 15 Drawing Sheets

Cross Section 200 μm

Inner Surface 1 μm

METHOD AND APPARATUS FOR SEPARATING MIXTURES OF ORGANIC AND AQUEOUS LIQUID PHASES

FIELD OF THE INVENTION

The present invention relates to a method and apparatus for separating mixtures of organic and aqueous liquid phases, and in particular to the separation of such mixtures into a substantially organic-free aqueous phase and a substantially aqueous-free organic phase.

BACKGROUND OF THE INVENTION

The need for separation of organic from aqueous liquid phases is exemplified by fuel spills on bodies of water and soils, and the requisite clean-up activity. Various methods and apparatus have been used to contain and/or clean up the spill, to prevent damage to the environment. The need for separation also arises in the areas of water wetted fuels at storage terminals. As well, the removal of water from crude oil is a separation of prime concern to that industry.

DESCRIPTION OF THE PRIOR ART

One prior art approach has been to separate the organic from the aqueous phase using microporous hollow fibres, wherein a mixture of such materials is forced into contact with the inside surface (lumen) of the fibres, commonly referred to as the "downbore" approach. An example of this approach is in Nohmi et al. U.S. Pat. No. 4,229,297, which teaches a method of separating oil from an oil-containing liquid. It is well-known in the art that for a two-phase down-bore feed, the pressure drop over a given length of fibre is not predictable. Accordingly, Nohmi et al. would not be useful for separating such a mixture into water-free oil and oil-free water. That is, when the pressure exceeds the pressure at which both oil and water pass through the micropores ie. the break-through pressure of water, it is no longer possible to achieve the desired result.

Another approach is described in published Canadian application of G. Sutherland and C. Glassford, serial no. 2,248,280. In this approach, the feed stream is fed to the fibres from the "outside-in". This is an improvement over a "downbore" feed since a much lower pressure drop is involved, permitting higher feedstream rates. Specifically, a method and apparatus are described, for separating an immiscible organic compound from an aqueous mixture containing the compound and an aqueous phase, the method comprising the steps of:

providing a plurality of hollow hydrophobic fibres having micropores therein and having exposed ends inaccessible to the mixture, the micropores extending from the outside of each fibre to the hollow interior thereof;

creating a pressure differential between the mixture and the hollow fibres such that the mixture is under higher pressure relative to the fibre lumen, the pressure being sufficient to permit passage of the organic compound but insufficient to allow aqueous passage into the micropores and for the hollow fibres to collapse;

contacting the micropores of the fibres with the mixture;

collecting the immiscible organic compound; and discharging the aqueous phase substantially devoid of the immiscible organic compound.

The apparatus employed by thr reference comprises a plurality of hollow hydrophobic fibres having micropores therein. The micropores extend through the fibres from the outside to the hollow interior or lumen. The pores sizes will vary, depending upon the material of which the fibre is made and the intended use of the fibre in terms of the organic contaminent to be removed. Generally, the pore size is large enough to permit an acceptable flux, but small enough to exclude water. Pore size ranges of 0.03 microns to about 5 microns are disclosed. A pressure differential as between the mixture and the fibre lumen is provided by a positive pressure pump.

It has been found that the method and apparatus of Sutherland and Glassford have certain drawbacks. First, there is no appreciation in the reference that the use of most positive displacement pumps in providing the pressurised feed stream to the fibres will cause the formation of 'oil in water' emulsions. In such emulsions, organic liquid droplets become surrounded by water droplets, and thus not 'recognised' by the fibre as organic phase. Such droplets will not pass through the micropores, leaving substantial amounts of organic liquid in the aqueous phase ie. the aqueous phase removed is not organic free. 'Water-in-oil' emulsions do not appear to be a problem, as the surrounding oil droplets are recognized by the fibre as organic, and the central water droplet is typically far larger than the pore size of the fibre.

Also, the reference does not recognise that certain organic phases, e.g. crude oil, contain large particle size, high molecular weight organic particulates such as waxes or asphaltines. These particulates can be of a size that greater than the pore diameter of the micropores. Being organic in nature, these particulates will tend to 'blind' the micropores, reducing and ultimately preventing the passage of the lower molecular weight oil.

Further, we have found that the Sutherland/Glassford technology, having two product streams, an aqueous product stream and an organic product stream, has production limitations. The restriction to two such product streams in itself limits productivity. Further, it was not recognized that the buildup of productivity reducing agents such as surfactants, also reduces productivity. More specifically, the reference does not recognise that most organic liquids such as crude oil, fuels, etc. will contain both natural and/or man-made surfactants. Man-made surfactants are frequently present in the form of scale inhibitors, corrosion inhibitors, oxygen scavengers and biocides. Such molecules, due to their 'dual nature', (having both aqueous and organic 'portions') can build up on the fibre surface and occlude the pores. The method of operation taught in the reference can exasperate this build up, resulting in a decline in organic recovery rates and therefore overall productivity. It can also result in frequent shutdowns and affects continuous operation.

SUMMARY OF THE INVENTION

According to one aspect of the invention, a method is provided for separation mixtures containing an aqueous liquid phase and an immiscible organic phase, into a substantially organic-free aqueous phase and a substantially aqueous-free organic phase, comprising a) providing a plurality of hollow hydrophobic fibres having micropores therein and having exposed ends inaccessible to the mixture, the micropores extending from an outside surface of each fibre to a hollow interior portion thereof, b) pressurising the mixture in a controlled low shear manner to minimise emulsification of the organic and aqueous phases, such that the mixture is under higher pressure relative to the hollow interior of the fibres to provide a pressure differential between the mixture and the hollow interior of the fibres, c) contacting the fibres with the pressurised mixture, the pressure differential being sufficient to permit passage through the micropores of the immiscible organic phase, but insuffucient to allow passage through the micropores of the aqueous phase, and for the fibres to collapse, d) collecting the substantially organic-free aqueous phase which has not passed through the pores of the fibres, and e) collecting the substantially free aqueous free organic phase which has passed through the pores of the fibres.

According to another aspect of the invention a method is provided for separating mixtures containing an aqueous phase and an immiscible organic phase which contains large organic particulates, into a substantially organic-free aqueous phase and a substantially aqueous-free organic phase, comprising a) providing a plurality of hollow hydrophobic fibres having micropores therein and having exposed ends inaccessible to the mixture, the micropores extending from an outside surface of each fibre to a hollow interior portion thereof, b) treating the mixture to reduce the particle size of the organic particulates to a size equal to or less than the pore size of the fibre, c) pressurising the mixture in a controlled low shear manner to minimise emulsification of the organic and aqueous phases, such that the mixture is under higher pressure relative to the hollow interior of the fibres to provide a pressure differential between the mixture and the hollow interior of the fibres, d) contacting the fibres with the pressurised mixture, the pressure differential being sufficient to permit passage through the micropores of the immiscible organic phase, but insuffucient to allow passage through the micropores of the aqueous phase, and for the fibres to collapse, e) collecting the substantially organic-free aqueous phase which has not passed through the micropores, and f) collecting the substantially free aqueous-free organic phase which has passed through the micropores.

According to yet another aspect of the invention, a method is provided for separating mixtures containing an aqueous liquid and an immiscible organic phase, such a mixture may also contain a surfactant or surfactants determined to be detrimental to the long term productivity of microporous hollow fibres, comprising, a) providing a plurality of hollow hydrophobic fibres having micropores therein and having exposed ends inaccessible to the mixture, the micropores extending from an outside surface of each fibre to a hollow interior portion thereof, b) pressurising the mixture in a controlled low shear manner to minimise emulsification of the organic and aqueous phases, such that the mixture is under higher pressure relative to the hollow interior of the fibres to provide a pressure differential between the mixture and the hollow interior of the fibres, c) contacting the fibres with the pressurised mixture, the pressure differential being sufficient to permit passage through the micropores of the immiscible organic phase, but insuffucient to allow passage through the micropores of the aqueous phase, and for the fibres to collapse, d) collecting as a first product stream which has not passed through the micropores, a substantially organic-free aqueous phase, e) collecting as a second product stream which has passed through the micropores, a substantially aqueous-free organic phase, and f) collecting as a third product stream, which has not passed through the micropores, a stream comprising an organic phase and <0.5% of water.

As will be explained more fully, in the Detailed Decription of the inventioin that follows, those skilled in the art will recognise that this third product stream is the same quality of stream that can be obtained from a properly designed and operated coalescing device.

An advantage of this aspect of the current invention operated in this manner is the fact that the plurality of fibres can be housed within the same type of housing, thereby allowing three useful product streams to be produced from a single feed mixture. The amount of water in the third product stream is such that either this stream alone still 'meets spec' and is therefore of useful quality, or in combination with some or all of the substantially aqueous-free organic phase, the resulting mixture still 'meets spec' and is therefore of useful quality. The mixing of the third product stream with the substantially aqueous-free organic stream thus improves productivity.

According to a further aspect of the invention, an apparatus is provided for separating mixtures containing an aqueous liquid and an immiscible organic phase, such a mixture may also contain a surfactant or surfactants determined to be detrimental to the long term productivity of microporous hollow fibres, comprising, a) microporous hydrophobic hollow fibre means, the fibres having micropores therein and having exposed ends inaccessible to the mixture, the micropores extending from an outside surface of each fibre to a hollow interior portion thereof, b) means for pressurising the mixture in a controlled low shear manner to minimise emulsification of the organic and aqueous phases to provide a feed steam which is under higher pressure relative to the hollow interior of the fibres to provide a pressure differential between the mixture and the hollow interior of the fibres, such that when the fibres are contacted with the pressurised mixture, the pressure differential being sufficient to permit passage through the micropores of the immiscible organic phase, but insuffucient to allow passage through the micropores of the aqueous phase, and for the fibres to collapse, c) means for collecting as a first product stream which has not passed through the micropores, a substantially organic-free aqueous phase, and d) means for collecting as a second product stream which has passed through the micropores, a substantially aqueous-free organic phase.

In some embodiments, means is provided for collecting as a third product stream, which has not passed through the micropores, an organic phase containing <0.5% of an aqueous liquid.

In some embodiments, means for controlling product flow is also provided in association with the third product stream.

The hollow fibres may be arranged in various manners, such as in an array, a diverging pattern, a parallel pattern, an intersecting pattern, bundled into one or more modules, incorporated into a mat structure etc. as will be apparent to those skilled in the art.

The fibre material is selected such that the contaminant and the processing conditions do not deleteriously affect the properties and structure of the fibres, with respect to lumen size, internal diameter, external diameter, pore size or surface characteristics, such as hydrophobicity. For example, the fibres do not collapse or exhibit any appreciable reduction in pore size in the presence of various organic contaminants, and will withstand the high operating temperatures of up to 70° C. used in the processing of some materials. For most applications a temperature range of 30–70° C. is appropriate. In some cases, such as involving heavy oils or complex mixtures of oils, the operating temperatures may be even higher.

For some types of fibres, their tendency to incur dimensional changes in the presence of such contaminants and high temperatures, is overcome by providing a stabilizing means e.g in the form of a tubesheet formed of a synthetic resin such as an epoxy resin. The stabilizing means maintains the relative positioning of the fibres in a spaced and connected relation to provide maximum fibre surface area exposure, and prevents kinking or excess distortion of the fibres, particularly when grouped in a bundle.

The pore size of the fibres will vary, depending upon the intended use of the fibres. Generally, the pore diameters will be large enough to permit an acceptable flux, but small enough to exclude water due to surface tension effects of the hydrophobic fibre.

DETAILED DESCRIPTION OF THE INVENTION

Figure 1:
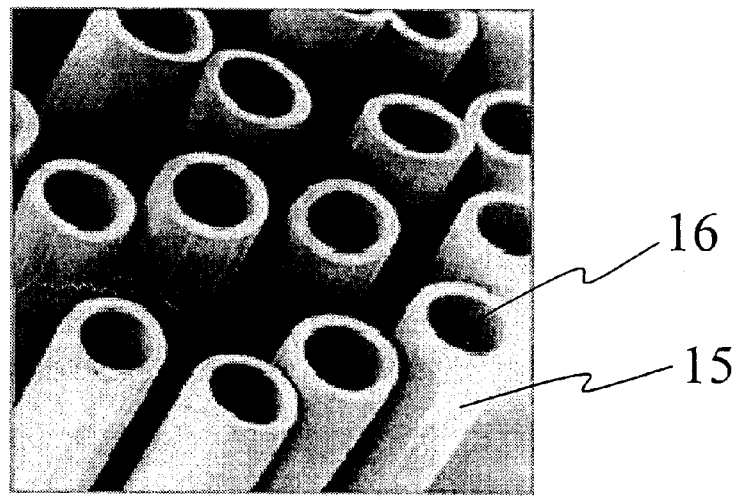
FIG. 1 shows a cross section of microporous hollow fibres.
Figure 2:
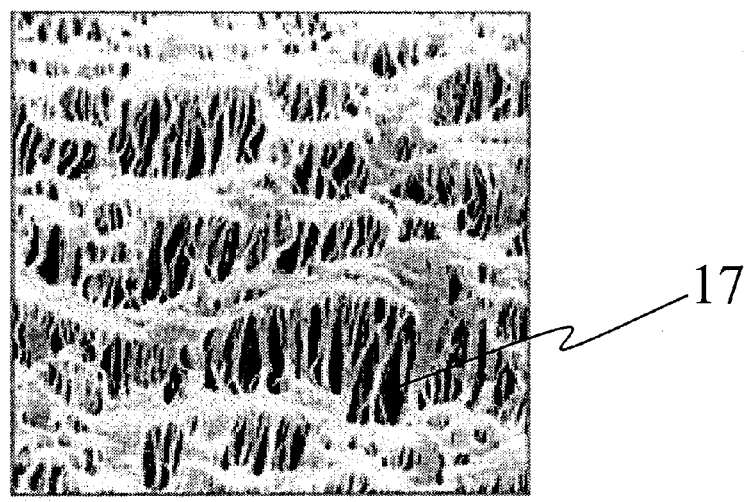
FIG. 2 shows the pore structure of microporous hollow fibres.

The invention employs microporous hollow fibres. As can be seen in FIGS. 1 and 2 the fibres 15 include a hollow core 16, and pores 17 which pass through the fibres. The fibre material must be hydrophobic.

Suitable hydrophobic fibre materials include polyolefins e.g. polyethylene and polypropylene, including those made by Mitsubishi Rayon, e.g polyethylene sold under the trademarks Sterapore, EHF and KPF. These products can be obtained with pore sizes typically of 0.03–5.0 microns.

Other suitable fibre materials include longer chain polyolefins including polybutene, polyisobutylene, polypentene, poly(4-methyliospentene) and their halogen-substituted derivatives having at least one fluorine atom, polystyrene and a halogenated polystyrene having at least one fluorine atom, copolymers of ethylenically unsaturated hydrocarbons, and/or halogen-substituted ethylenically unsaturated hydrocarbons having at least one fluorine atom, ethylenically unsaturated hydrocarbons and their halogen-substituted derivatives including ethylene, propylene, butene, isobutylene, pentene, hexene, monofluoroethylene, vinylidene fluoride, trifluoroethylene, hexafluoropropylene and the like, and blend polymers such as a combination of polyethylene with polypropylene, polyvinylidene fluoride, polytetrafluoroethylene, or polystyrene, a combination of polypropylene with polyvinylidene fluoride or polytetrafluoroethylene and the like.

Figure 3:
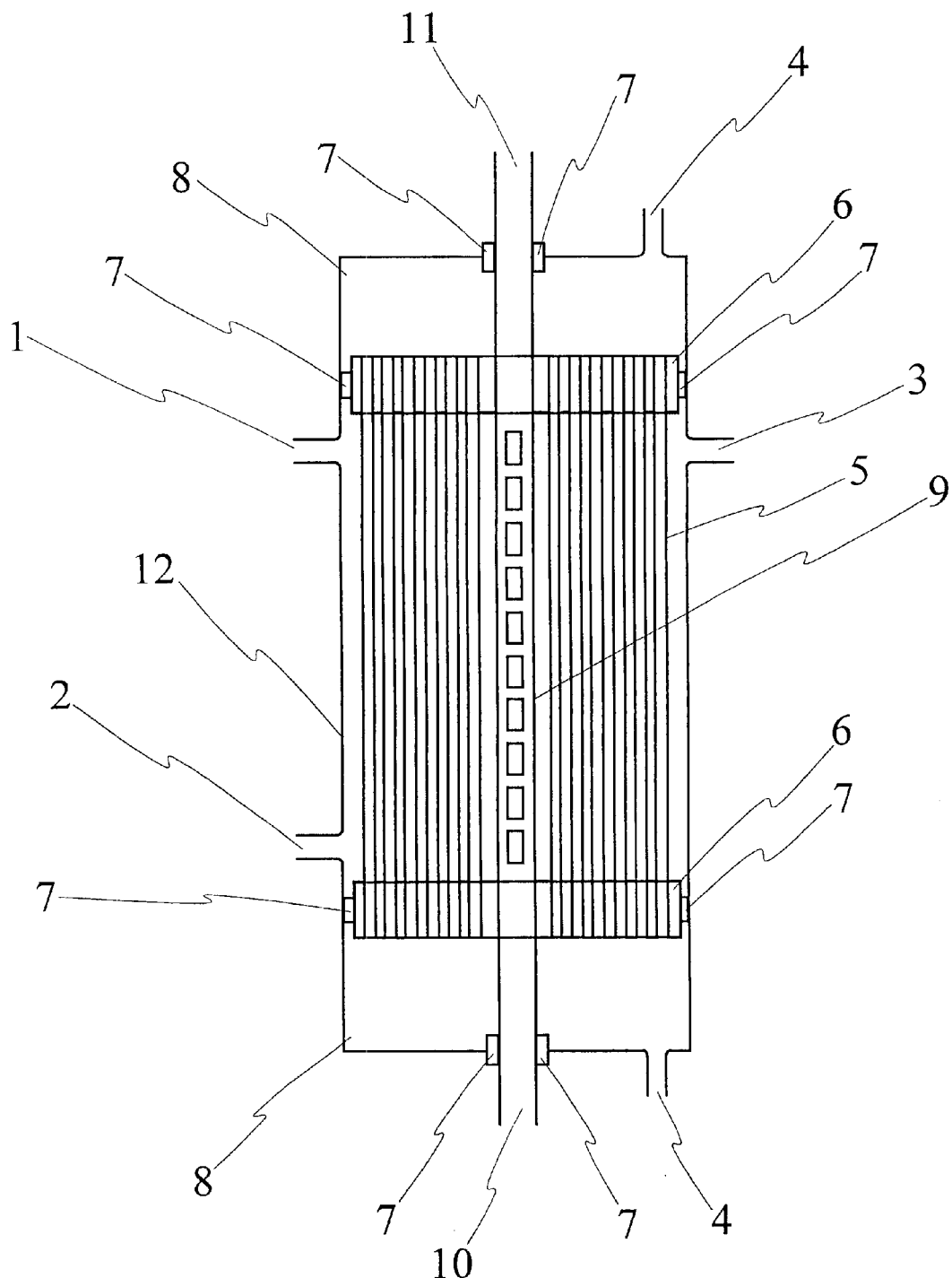
FIG. 3 shows a microporous hollow fibre separation device.

As seen in FIG. 3, for use in organic/aqueous separation, the MHF (microporous hollow fibre) separation device includes fibres 5 arranged as a bundle 5 which wrapped around a core 9, in an enclosure case 12, also known as a shell. The core 9 is slotted in order to receive fluid which has not passed through the pores and allow it to exit the device. It is obvious to anyone skilled in the art that many bundles may be placed within a single shell. The fibres are supported near both their open ends by support means eg. by tubesheets 6 formed of a synthetic resin such as an epoxy resin. O-ring seals 7 are used to prevent fluid leakage. The feed stream is fed under pressure into the shell through inlet 1. This pressure is higher relative to the lumen(inside) of the hollow fibres, and also the organic collection area 8. The hydrophobic nature of the fibres tends to repel aqueous components in the feed while attracting organic constituents. Flow of organic constituents through the micropores is laminar and is governed by the viscosity of the organic, the pore size of the fibres and the pressure differential which exists between the (shell) outside and the lumen (inside) of the hollow fibres. The organic is ultimately collected in collection area 8 and removed from the device through clean oil outlets 4. Three exits exist for removing fluid from the shell, in addition to shell drain 2. Clean (now substantially oil-free) aqueous phase (and various contaminants that prefer to remain with the aqueous phase e.g salt) is withdrawn through clean water outlet 10. By virtue of the nature of the feed stream, or upon start up, it may be necessary to remove gas (vapour) from the device. This can be accomplished through ports 3 and 11. The shell and the ports, as well as optional baffles (not shown) that can be employed, are located and designed in such a way as to assure that the device will perform as a coalescing unit, that results in the provision of a third product stream of useful quality, ie. a (mainly) organic stream containing <0.5%/w of water, exiting through either ports 3 and/or 11.

Pressure is provided to the feed fluid in a gentle manner by pressurising means e.g. a low shear pump or alternatively, by gravity if the opportunity exists. This provides the requisite feed pressure, while preventing emulsion formation. It is believed that the mechanism involved is the prevention of formation of organic in water emulsions, including organic droplets surrounded by aqueous droplets which are not recognized by the hydrophobic fibres as organic and will thus not pass through the fibre pores. An example of such a pump is a progressive cavity pump.

The net result of the above is a control scheme which is dramatically different from that taught in the prior Sutherland and Glassford reference. This can be seen in FIG. 4. For comparison purposes, the method of Sutherland and Glassford is illustrated in FIG. 5. In our scheme, means for controlling the product flow is provided e.g. as a low flow valve being located on the clean water outlet. This is particularly useful when the overall aqueous liquid content of the feed stream is low and/or variable, as it prevents undo 'pressure bumps' within the device.

In the flow control scheme described in the aforementioned Sutherland/Glassford reference schmematically illustrated in FIG. 5, all of the organic phase must not only enter the module but also pass through the micropores of the fibres. For fast turnaround, this requires enormous numbers of modules. Second, problems arise when the feed stream contains only a small amount of the aqueous liquid. Specifically, the control scheme described by Glassford/Sutherland and shown in FIG. 5 requires pressure/flow control by a valve 30 located on the aqueous liquid stream exit 10. For applications in which the feed steam contains very small of amounts of aqueous liquid and the amount of aqueous liquid being variable, it is extremely difficult to control and is likely to result in aqueous liquid product stream of inconsistent quality.

Figure 4:
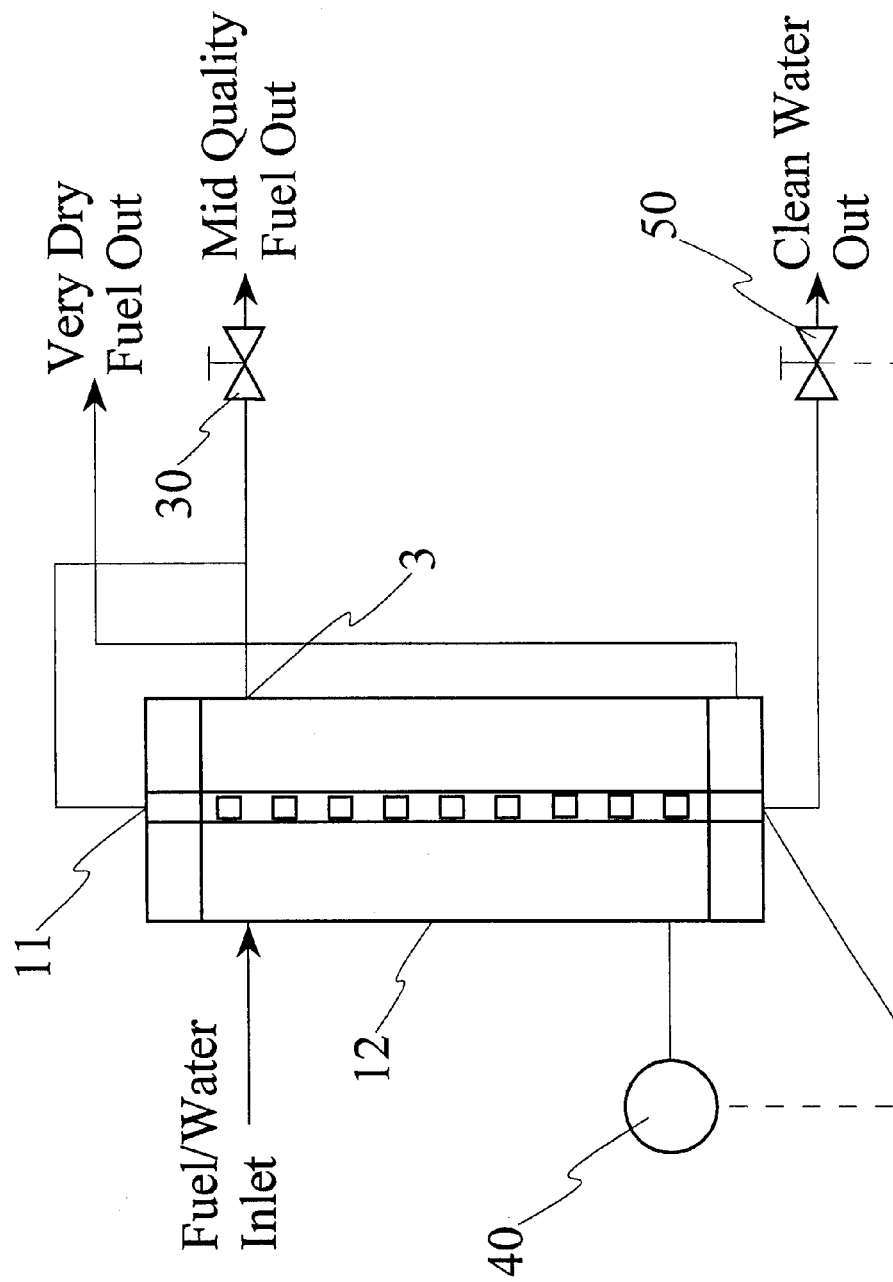
FIG. 4 shows a control scheme for operating a microporous hollow fibre separation devices according to the invention.
Figure 5:
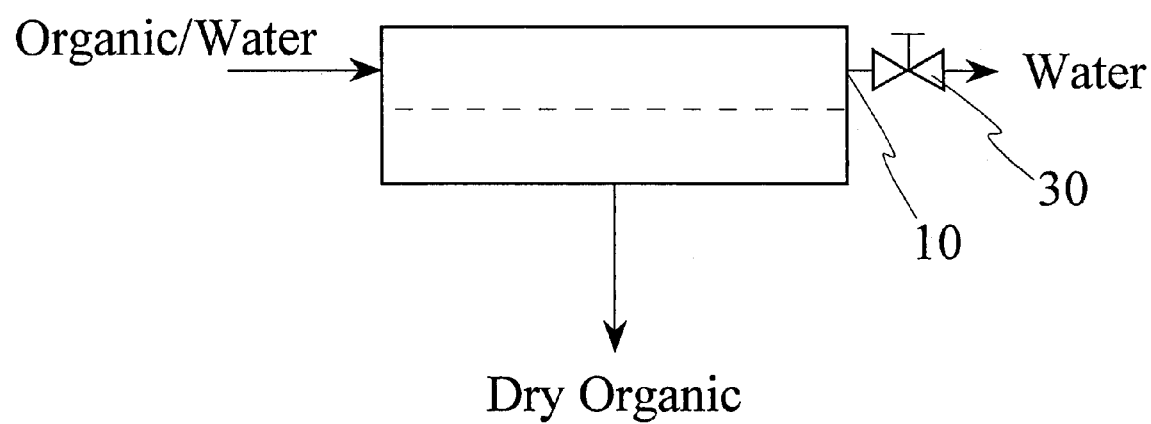
FIG. 5 shows a control scheme for operating a microporous hollow fibre separation device as described in the prior art.

As shown in FIG. 4, using the microporous hollow fibre module 12 shown in FIG. 3 according to the present invention, provides a far better and unexpected operation control scheme which improves on these shortcomings. More specifically, 1) When the feed stream enters the module 12, it immediately impacts upon the fibre bundle. This bundle acts as a coalescing surface. Since the fibres are hydrophobic aqueous liquid droplets 'bead up' on the surface and begin the fall by gravity towards the bottom of the module. These collect at the bottom of the module. Using, for example, a conductivity type sensing probe 40, the level of aqueous liquid build up can be monitored. When the level reaches a predetermined height, the low-flow aqueous liquid outlet valve 50 is actuated. This valve is low flow so as to have minimum impact on the pressure within the module. In this way, good water quality is provided.

2) Since much of the water 'falls out' of the feed stream due to coalescing/gravity, a third product stream is created, which is already sufficiently dehydrated to meet quality specs. This stream which contains <0.5% of aqueous liquid has not passed through the fibre pores, is withdrawn through outlet 11 and/or 3 as a third product stream, is called 'mid quality fuel'. Accordingly, in our system, all of the organic phase need not pass through the fibre pores. Moreover, when added to that portion of the feed which has passed through the fibre pores and exits the module as 'very dry fuel', the result is a module which has far increased production capacity to deliver 'spec quality product'. This of course reduces processing time and/or reduces the number of modules needed to process a given amount of material. It should also be noted that in this system, the pressure/flow control valve, unlike in the prior art Glassford/Sutherland, is located on this mid quality product stream. The mid-quality stream containing >0.5% of water, may be mixed with the very dry fuel stream to enhance productivity.

It is therefor a major advantage of this system, unlike any prior art system, to turn one feed stream into three useful product streams.

This embodiment of the invention is likely best suited for lower water content streams (say less than 5–10%)

Another advantage of such a system is that fluid is being continuously circulated and withdrawn from around the fibres. This provides a passage for both particulates and surfactants to leave the module, thus preventing them from building up and causing production declines. More specifically, surfactants can be adsorbed onto the fibres and build up and eventually 'block' or effectively reduce the size if the pores. The third stream can thus provide an additional passage for such 'bad actors' to leave the device. Operating at temperatures which are above the particle shift temperature of the organic, and below the temperature limit of the fibre material, will also reduce the tendency of some surfactants to be adsorbed.

It will be appreciated that the individual devices may be installed in various arrangements to handle the fluid type, flow conditions and separation requirements.

Performance Control Factors

Viscosity

As taught in Sutherland and Glassford, the flow of organic through the pores is inversely proportional to the viscosity of the organic fluid. For example:

Rate of gasoline>kerosene>diesel fuel>light crude oil>heavy crude oil

Given sufficient time, most high viscosity organic fluids will flow through the pores.

With higher viscosity liquids, the separation process does not cease, but it can slow to the point where commercially viable production is inadequate. Therefore, where necessary to achieve commercially acceptable flows, the viscosity may have to be adjusted through heating, as in crude oil, or through the addition of a compatible diluent, such as in heavy oil or oil sands processing. Examples of compatible diluents include naptha and varsol. This diluent may, of course, be separated from the heavy oil by suitable means, and recycled back to the process.

Microporous Hollow Fibre

The invention employs hydrophobic microporous hollow fibres. Examples can be seen in FIGS. 1 and 2. The pore size is controlled by the manufacturing process. The larger the pore size, the more organic phase will pass through under equal pressure differentials.

Breakthrough Pressure

The breakthrough pressure is defined as that pressure differential at which water passes through the pores. The larger the pore diameter, the lower the breakthrough pressure. It will be appreciated by those skilled in the art that each fibre material and pore size has a differential pressure limit at which the aqueous phase will pass through the pores. Accordingly, the pressure differential may be in a range of a pressure differential which provides an acceptable flux, up to the breakthrough pressure at which the aqueous phase will pass through the micropores.

Pore Diameter

Given the above discussion, pore diameters in the range of 0.03–5.0 microns have been found to be useful for most applications. For some embodiments, pore diameters in the range of 0.05–0.25 are appropriate. In other embodiments, pore diameters of 0.1–0.2 microns are used.

Temperature

The viscosity of water and liquid petroleum products is also dependent upon temperature. When combined with the inverse productivity effect of viscosity described above, temperature control becomes a major factor for higher viscosity liquids such as crude oils. There are three temperature factors that are involved: i) organic particle size shift temperature, ii) polymer fibre material/structure operating temperature limit, beyond which the polymer structure begins to lose its structural integrity and iii) surfactant adsorption temperature range.

(i) EXAMPLE

Organic Particle Size Shift Temperature

Figure 6:
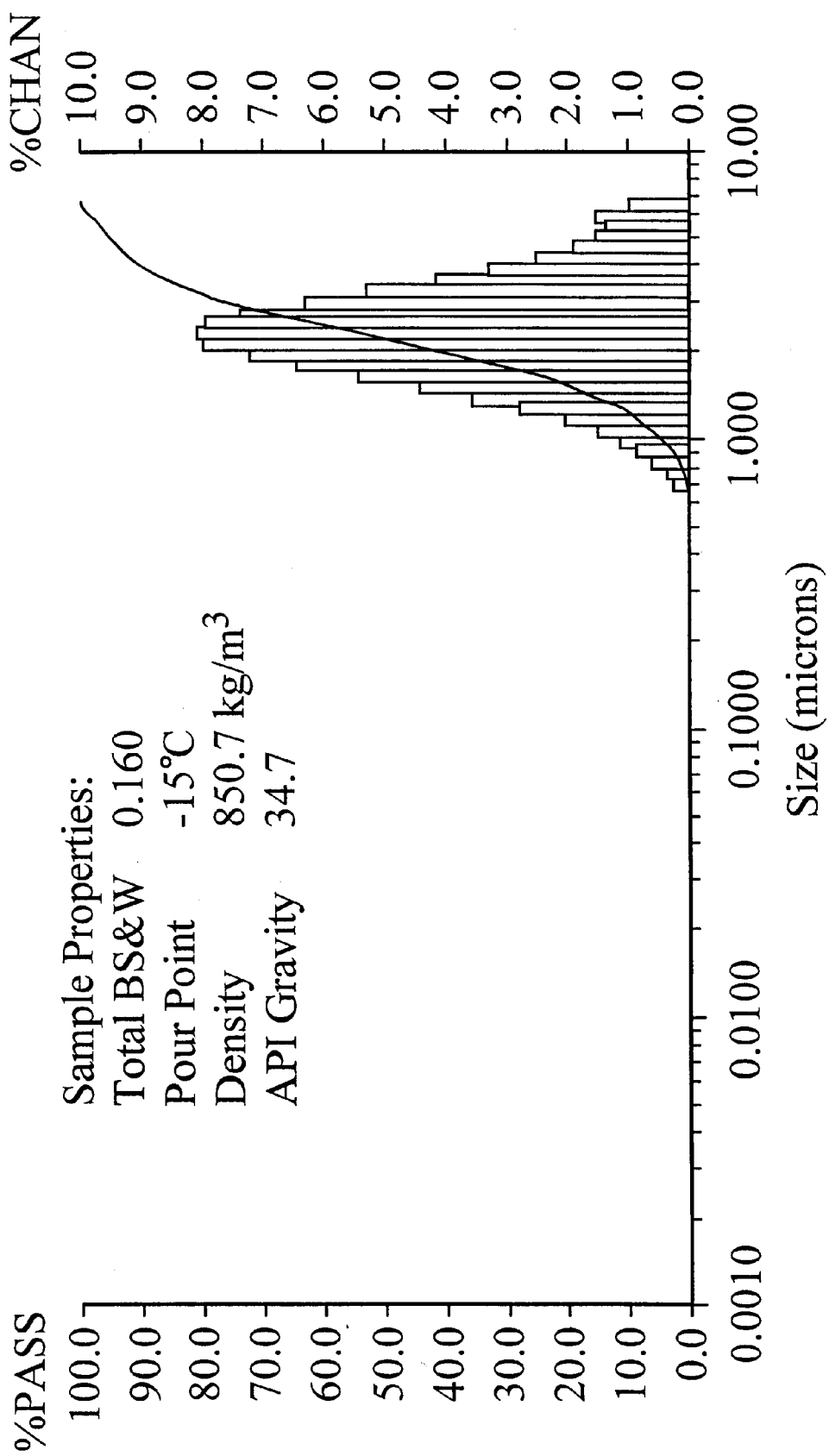
FIG. 6 shows the physical properties as well as an organic particle size distribution of a crude oil/water mixture taken at 20° C., using a prior art device.
Figure 7:
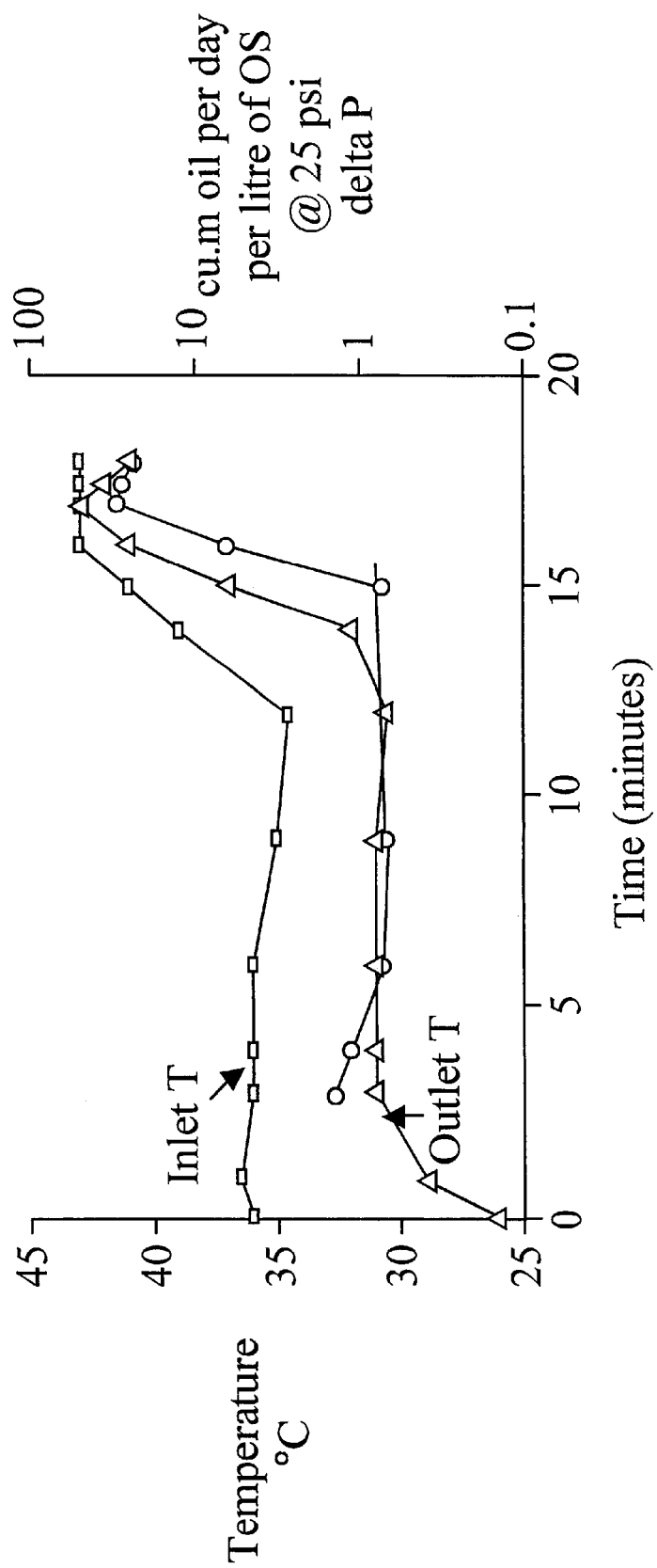
FIG. 7 shows improved productivity results of a crude oil processed using a microporous hollow fibre separation device according to the invention, as a function of temperature.
Figure 8:
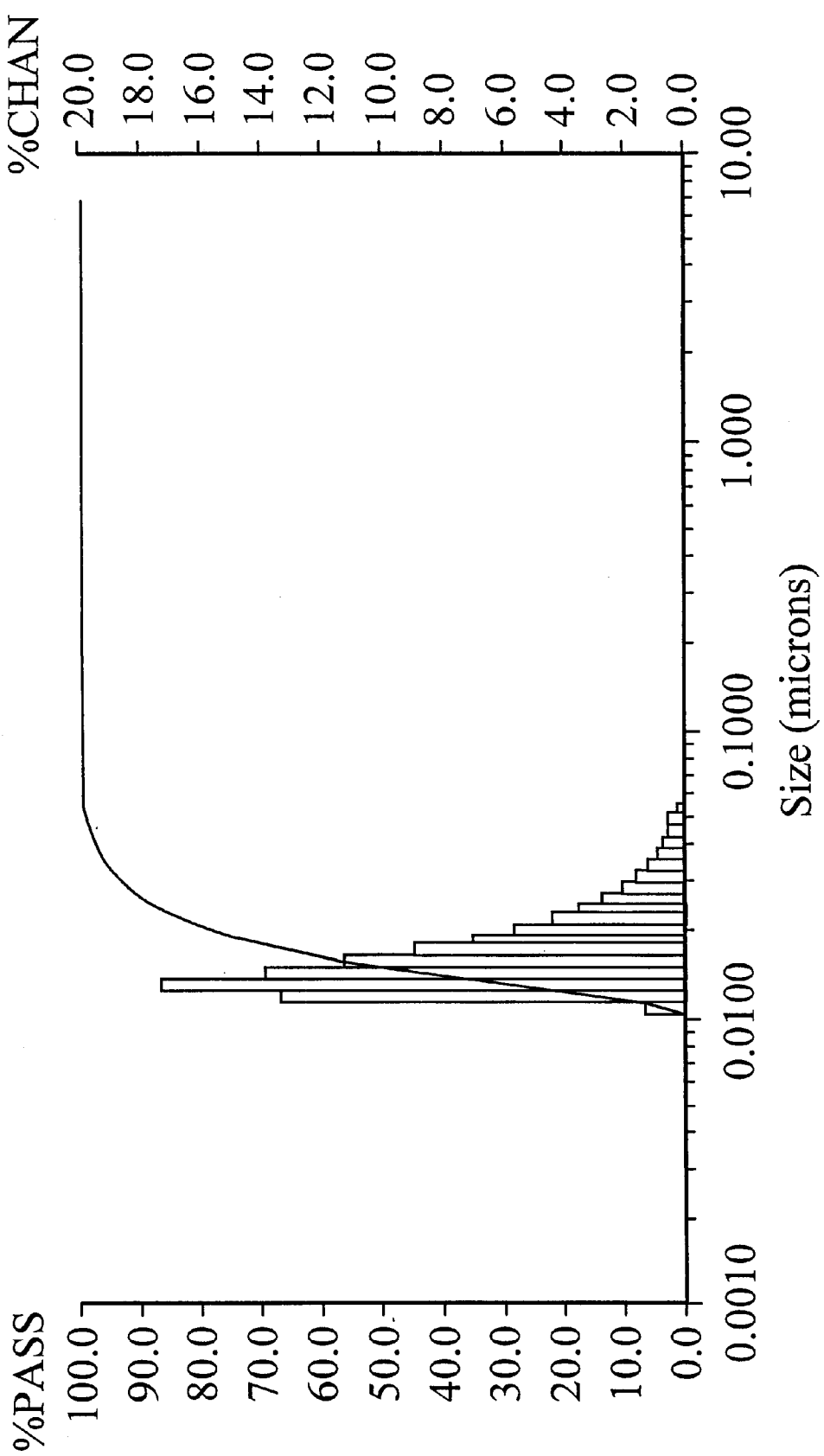
FIG. 8 shows an organic particle size distribution for a crude oil at 40° C.
Figure 9:
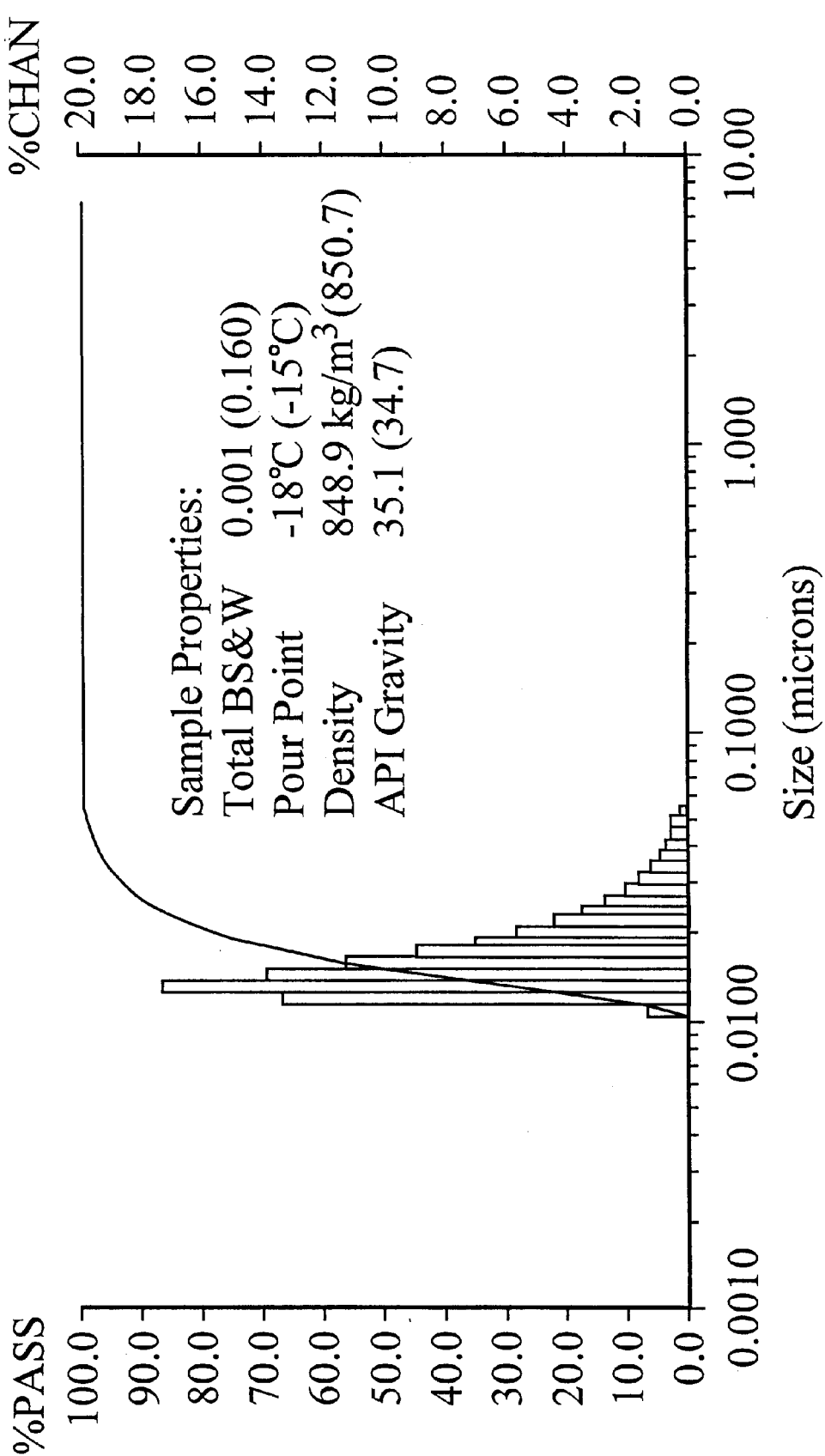
FIG. 9 shows the physical properties as well as an organic particle size distribution of crude oil produced by dehydration using a microporous hollow fibre separation device according to the invention, operated at 40° C.
Figure 10:
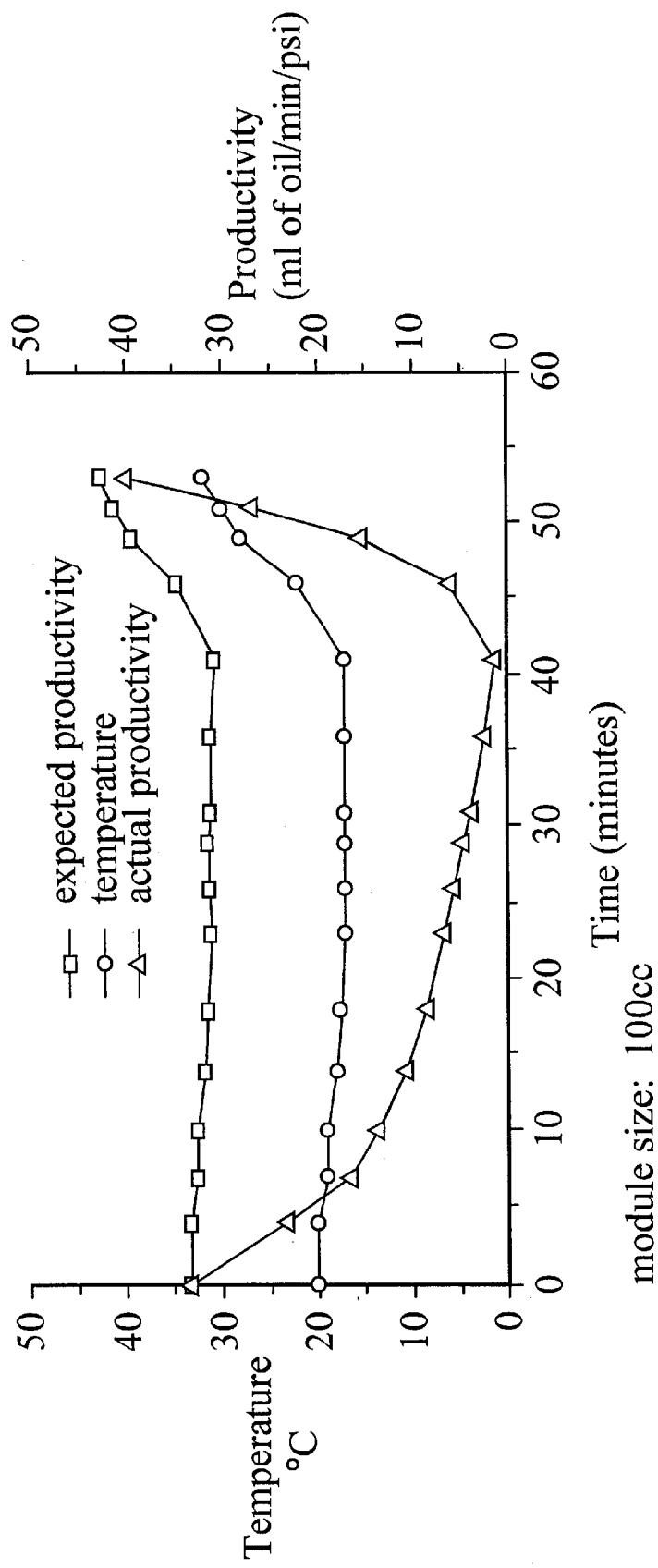
FIG. 10 shows the productivity of a microporous hollow fibre device according to the invention, when processing a kerosene/candle wax solution as a function of temperature.
Figure 11:
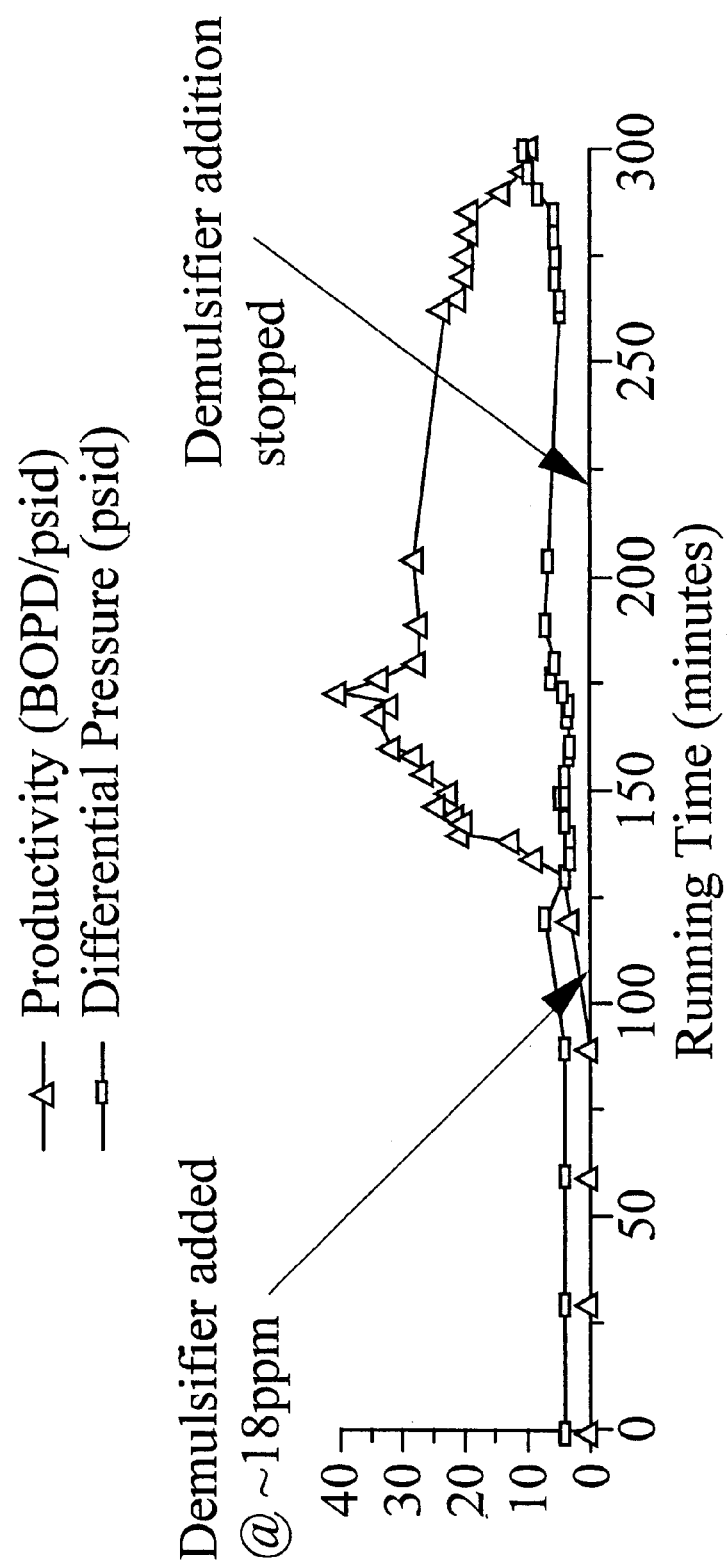
FIG. 11 shows the productivity of a system employing a microporous hollow fibre separation device according to the invention, for dehydrating crude oil, as a function of demulsifier addition.

When the method taught by the prior Sutherland and Glassford reference was employed on the crude oil detailed in FIG. 6, the results were disappointing. (In FIG. 6, the term 'BS & W refers to basic solids and water fraction of the crude oil.) The fibre used in the MHF device was EHF 540 supplied by Mitsubishi Rayon and had a nominal pore size of about 0.1 microns. Productivity, determined by the flow of recovered oil, soon dropped dramatically (see FIG. 7). When the same oil is heated to 40° C. prior to being fed to the MHF device, the organic particle distribution within the oil changes dramatically as shown in FIG. 8, Productivity recovered to expected levels based on the fluid's viscosity. FIG. 9 gives details on the quality of the oil produced, this oil having passed through the micropores. It should be noted that this temperature increase did result in the viscosity of the oil being halved. However, the productivity increase in the device increased by a factor of about 50. Clearly, this is unexpected by the method of Sutherland and Glassford. This is also demonstrated in FIG. 10. Here a solution of kerosene containing 2 wt % candle wax was fed to a MHF device utilising EHF 540 fibres. It is only after a slight increase in temperature is employed that productivity reaches expected values, the increase in temperature being totally inadequate to explain the productivity increase in terms of viscosity alone.

Each particular oil should be tested first to ascertain the shift temperature, if required, as well as other product characteristics. Again, this is usually only a factor with higher viscosity products. Lighter, refined products, like gasoline, diesel, etc. usually require no pre-heating, for shift temperature purposes, even in colder climates.

(ii) Polymer Material Temperature Limit

Each particular polymer material used has an effective temperature limit, above which fibre damage occurs. Obviously, for those instances where the temperature required to produce the necessary particle size shift is greater than the temperature limit of the polymer, other means of reducing particle size must be found.

EXAMPLE

Particle Size Reduction Using Chemical Addition

Some organic particles, such as asphaltines, do not decrease in size sufficiently unless the temperature is raised higher than the maximum allowable temperature of the polymer. Alternatively, the economics might not favour raising the temperature of the feed stream. FIG. 11 shows an alternative. In this case, 4 MHF devices, each containing 6400 EHF 540 fibres of about 70 cm. in length, were employed. The oil was a Saudi Arabian light crude. With the addition of 18 ppm of KXZ 1266 demulsifier (Champion Chemicals), the production of dry oil (that oil which passed through the micropores) rose from virtually 0 to approximately 30 Barrels of oil per day per psi of differential pressure employed at 90° F. Clearly, such an effect is unexpected by Sutherland and Glassford.

Whichever type of particle size reduction method is employed, the particles must be reduced to a size equal to or less than the pore size/diameter of the micropores, and in some cases to an order of magnitude less than the pore size/diameter of the micropores.

(iii) Surfactant Adsorption Temperature Range

Surfactants are molecules which have a dual nature, part aqueous and part organic. As such, these molecules can attach themselves to the polymer and interfere with, for example, substantially water-free oil production. If only substantially water-free oil and substantially oil-free water are removed from a device, the concentration of surfactants can build up in the device. In the extreme, these chemicals can lower the water breakthrough pressure and result in an oil phase which is no longer substantially water free.

EXAMPLE

Surfactant Adsorption

Examples of surfactants commonly employed in oil field operations were mixed with various pure organics such as hexane, kerosene and paraffin oil. These mixtures were fed under pressure to small MHF devices (15 inches×96 EHF 540 fibres). Productivity decline as a function of surfactant content in terms of litres per minute of fluid passing through the micropores per psi of differential pressure employed was monitored for the various mixtures. These results are shown in tables 1–11 below.

Figure 12:
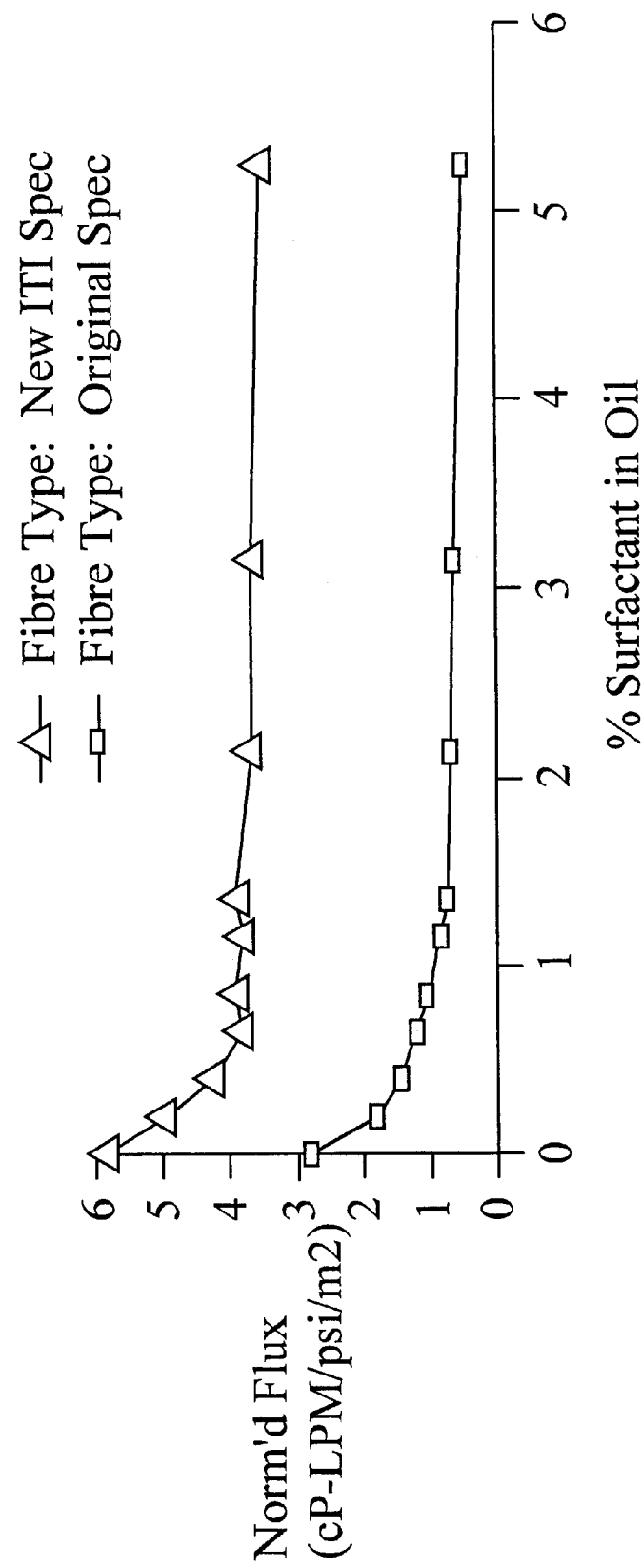
FIG. 12 shows the productivity of a microporous hollow fibre separation device according to the invention, utilising fibres of different pore sizes, as a function of surfactant addition.
Figure 13:
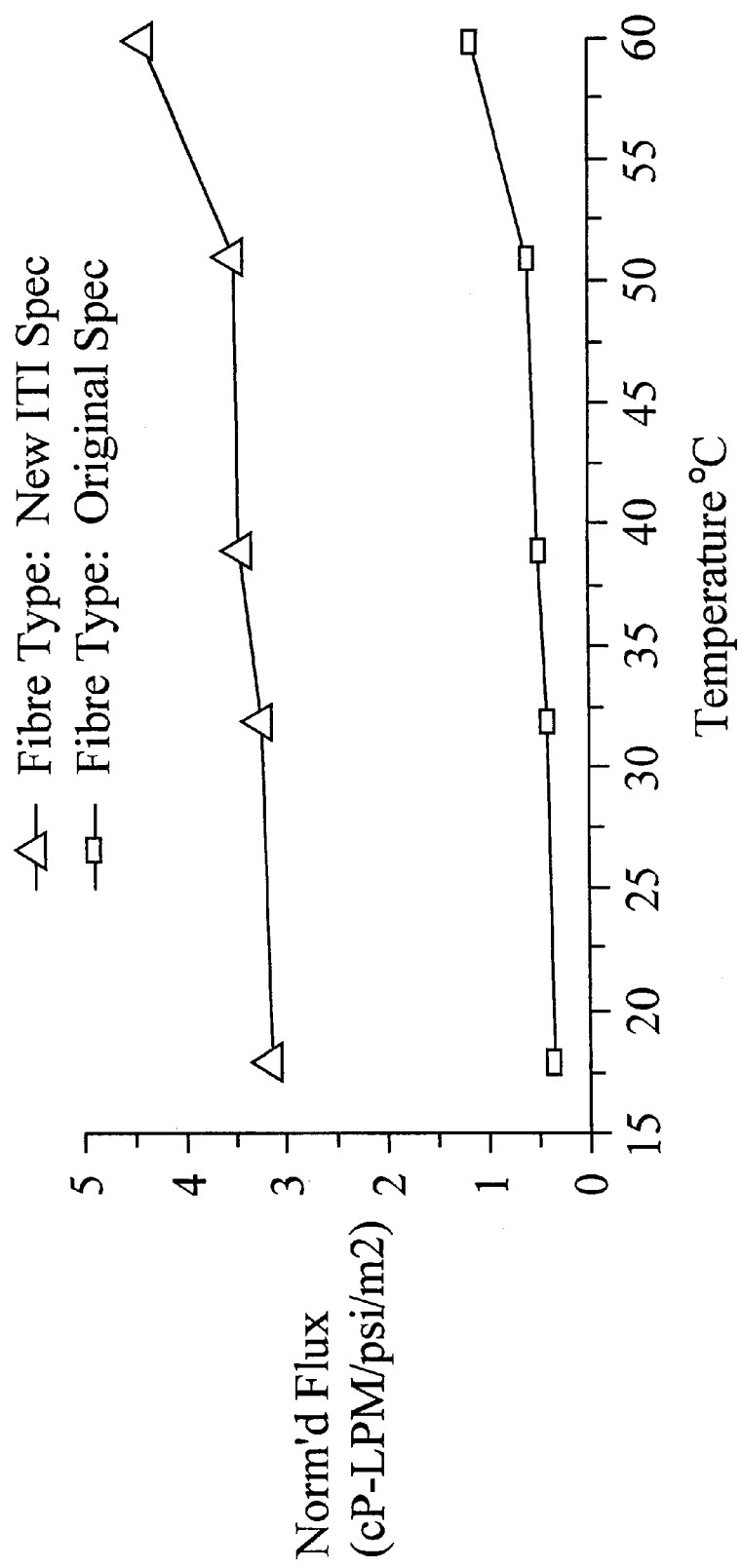
FIG. 13 shows the productivity of a micoporous hollow fibre separation device according to the invention, utilising different pore sizes, at equal surfactant concentrations, as a function of temperature.

The same test devices were employed in the following two examples: The example shown in FIG. 12 shows that the effect of surfactant adsorption can be offset somewhat by choosing the proper pore diameter. Here, polymer type B, EHF 270 w, has a larger pore diameter than 'original spec' fibre, EHF 540T (~0.2 vs 0.1 microns). Here, complete occlusion of 'organic pathway' or pore, is prevented by virtue of that pathway being too large to be 'bridged' by surfactant molecules. FIG. 13 shows another possible solution. Here an increase in operating temperature is shown to reduce the adsorption tendency of surfactants. The method of Sutherland and Glassford offers no solution to the, often negative, effects of these molecules.

Figure 14:
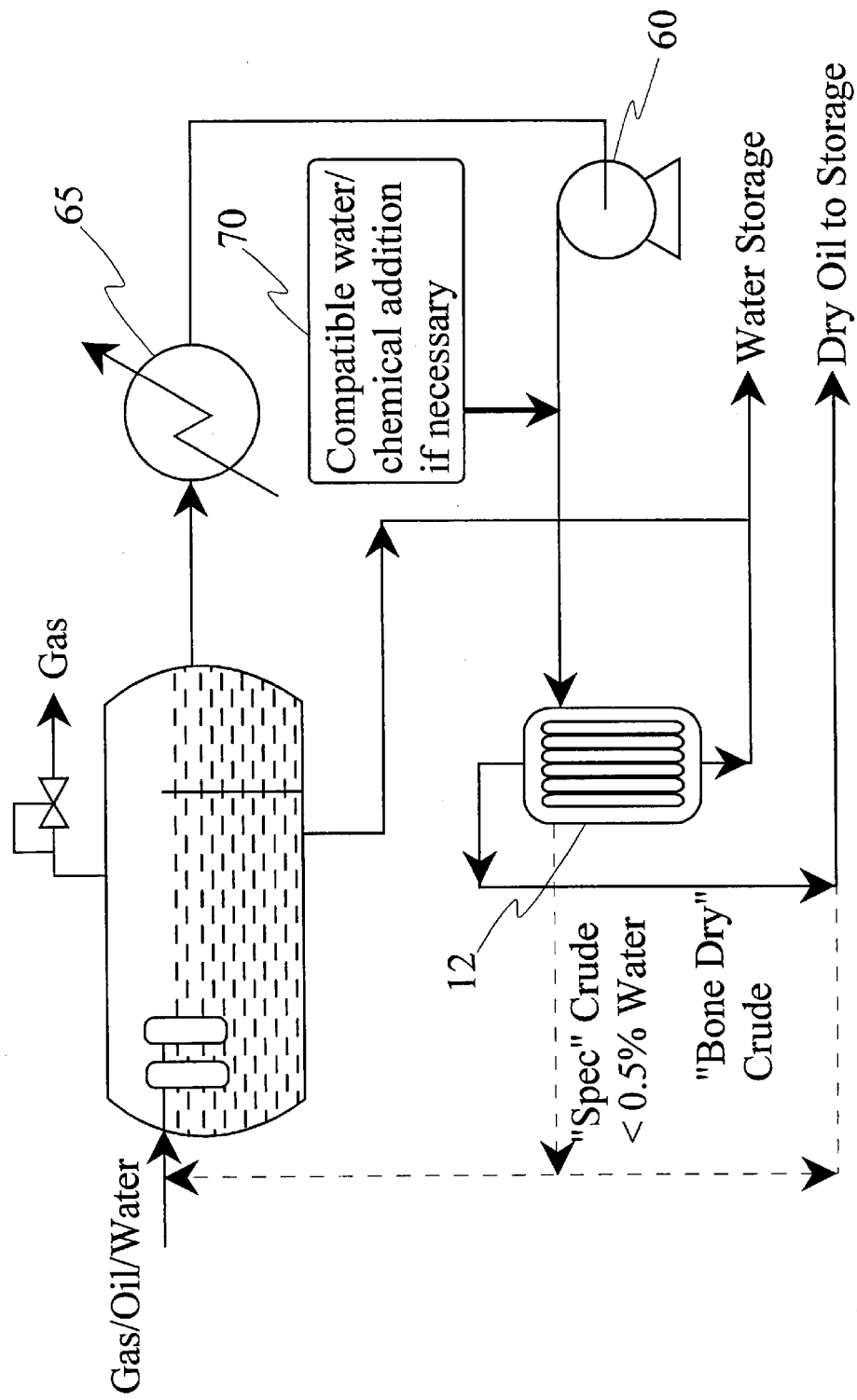
FIG. 14 illustrates a crude oil dehydration process schematic utilising a microporous hollow fibre separation device according to the invention.

FIG. 14 illustrates a typical crude oil dehydration process schematic employing the techniques discussed above. The exact configuration of the system is determined by the individual characteristics of the crude oil, or other petroleum product, and the necessary hydraulic control. For crude oil dehydration, a conventional 'three phase' separator can be employed upstream of the MHF separation devices. This more 'conventional' equipment can be utilized to remove gas, produce some quantity of water suitable for discharge, and an oil/water mixture which is fed to MHF separation devices. A non-emulsifying pump 60 (typically progressive cavity type) is used to pressurise the feed mixture prior to entry to the fibre module 12, and to maintain optimum process pressure control and productivity. The module productivity is directly proportional to the pressure differential. The pump maintains an adjustable steady state flow of sufficient pressure differential to produce acceptable production flows (without the addition of more separation devices) while preventing water/oil emulsion formation as discussed above and evolution of any solution gas in the modules. FIG. 14 also shows multiple MHF separation devices having been placed within a single encasing shell.

The design of the separation devices/case allows a third product phase "spec oil" that has not passed through the fibre pores and contains less than 0.5%/w water. The 'dry oil' which has received full treatment by passing through the fibre pores is substantially water-free. If the "spec oil" is mixed with 'dry oil', this considerably increases the productivity of the system. As shown by the dotted lines in FIG. 14, possible discharge of 'spec oil' with greater than 0.5% water is controlled with instrumentation (not shown), and can be recycled back to the feed mixture. A heater 65 is provided to raise the temperature of the feed mixture for some applications. A chemical addition station 70 is provided for adding chemicals, such as demulsifiers, or diluents to the feed mixture.

EXAMPLE

Crude Oil Dehydration

Fifteen MHF devices were housed in a common shell (FIG. 14). Each device contained 6400 EHF 540 fibres, 35 centimetres in length. A tanker truck provided light crude (39 'API), which was slightly 'off spec' in terms of water content, the spec being 0.5% water. Prior to being pumped up to pressure, using a progressive cavity pump, the oil was heated to 50–55° C., a temperature sufficient to reduce the organic particle size to acceptable levels, eliminating this factor as a variable. The system was first operated according to the method of Sutherland and Glassford (FIG. 5). Next, the method of operation was changed to employ the concept of the present invention of a 'third product stream' (FIG. 4). The results can be seen in FIG. 15. The red lines represent the 'one stream in, two streams out' approach of Sutherland and Glassford, while the yellow and blue lines were obtained when utilising the 'third stream' approach. The solid lines represent 'thru polymer' productivity at any moment in time. That is dry oil withdrawn from the system via the micropores. This oil is extremely dry and analyses showed it contained less than 0.1% water. The dashed lines represent cumulative extremely dry oil production by the system. The method of Sutherland and Glassford results in a quick productivity decline (and is unable to dehydrate the entire tanker truck) while the new method does so efficiently and quickly. The third stream obviously prevented the build up of productivity reducing "agents".

Figure 15:
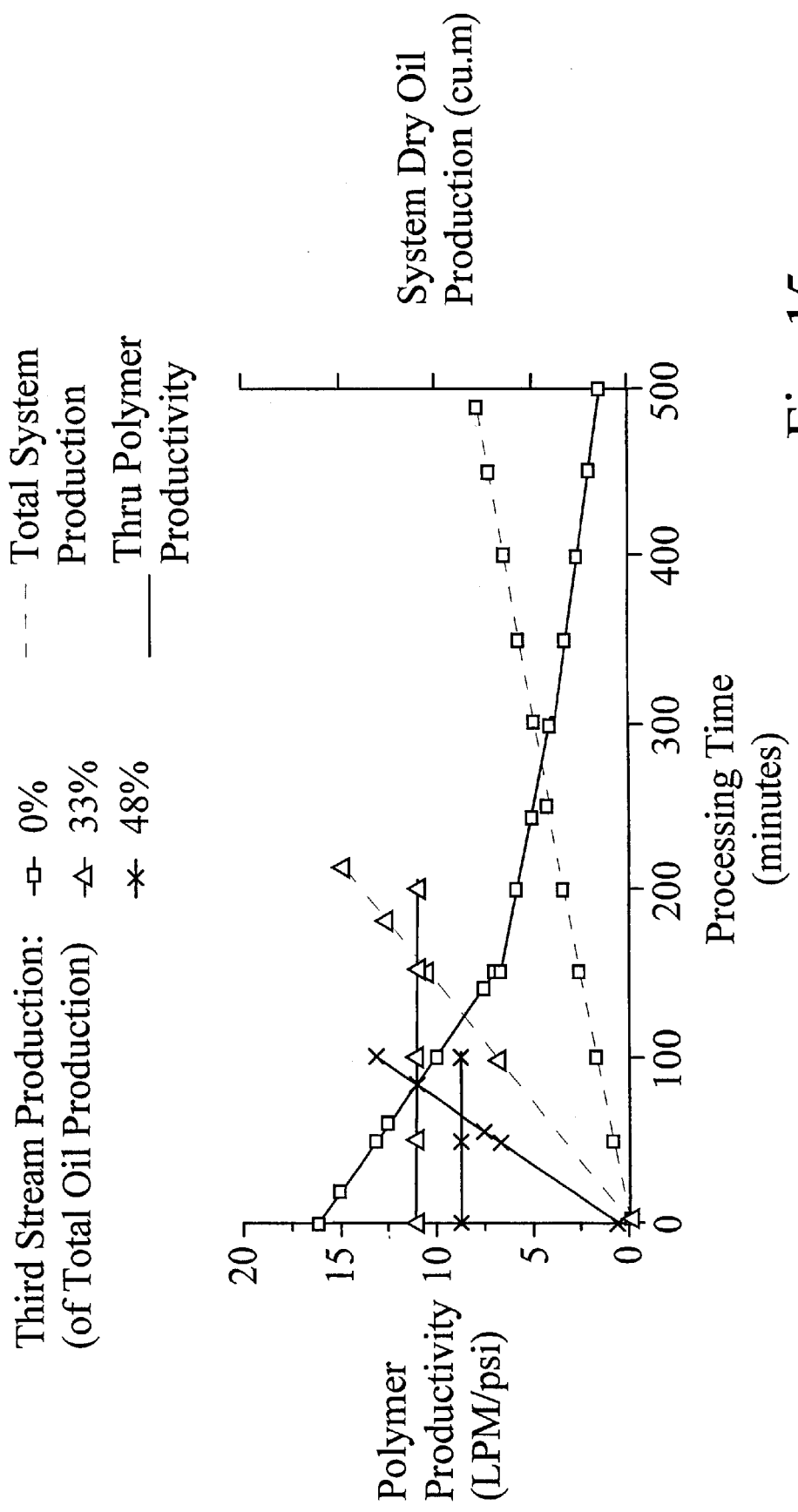
FIG. 15 shows crude oil dehydration data obtained from the system illustrated in FIG. 14.

Although it is not shown in FIG. 15, there is a further bonus achievable when the 'third stream' method is employed. Analysis showed that the water content of this stream still met the water content spec of <0.5%. It is thus apparent that if the extremely dry oil stream and the 'on spec' third stream are combined, the overall production rates will rise substantially.

EXAMPLE

Fuel Dehydration

Refined products such as fuels, require storage. Even though the products may enter the storage vessels 'on spec' in terms of moisture content, over time (due to condensation) the amount of water increases. (The likely amount of water is quite small and of the order of less than 5%. The amount of water is also variable.) This results in the contents of the vessels going 'off spec'. In turn, this results in either monetary penalties which must be paid or the downgrading of quality of the product and a lowering in its value (price).

Storage vessels, be they on shore or in a tanker, or extremely large. What is required is a dehydration system that can process the contents of the vessel as quickly as possible.

As mentioned above, the flow control scheme mentioned in the Sutherland and Glassford reference, when applied to oil storage vessels, has two distinct drawbacks. First, all of the fuel in the vessel must not only enter the devices but also pass through the walls (micropores) of the fibres. For fast turnaround, this requires enormous numbers of modules. Second, the amount of water in the stream may be extremely small. The control scheme described by Glassford/Sutherland requires pressure/flow control on the substantially oil free water stream exit. Since very small of amounts of water are involved, and the amount of water being variable, it is extremely difficult to control, and is likely to result in water of inconsistent quality.

Figure 16:
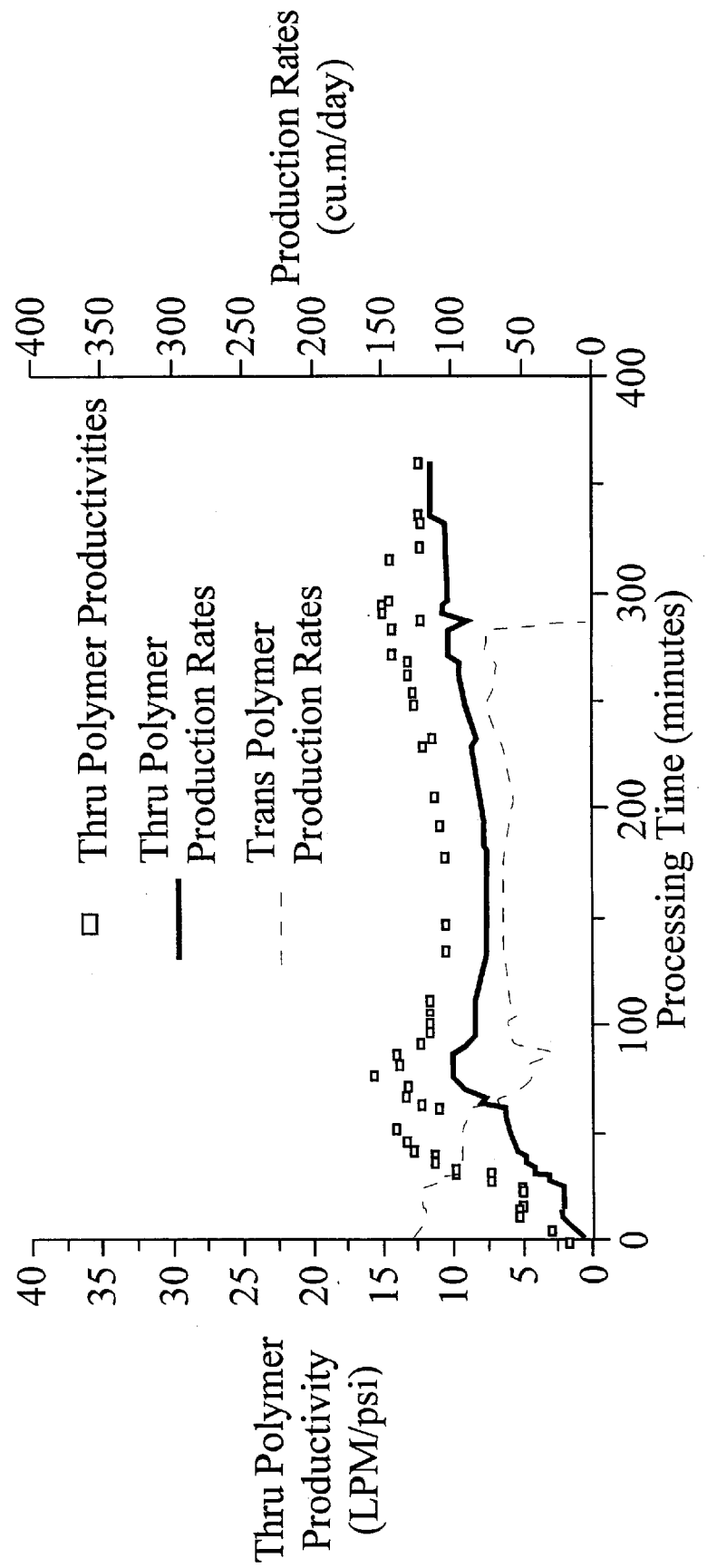
FIG. 16 shows fuel dehydration data obtained from the system illustrated in FIG. 14.

With the same 15 device system described above (FIG. 14), slightly 'wet' diesel fuel was dehydrated using the 'one feed stream in, three product streams out approach' of the present invention illustrated in FIG. 4. The results are shown in FIG. 16. The productivity through the micropores, referred to as 'thru polymer' productivity, represents the best production rate that can be achieved when employing the method taught by Sutherland and Glassford. Third stream or 'trans polymer' production was varied throughout the test. At no point was this analysed as being 'off spec'. Therefore, the total production rate is the sum of both product streams, which, in a loading or off-loading application results in faster turnarounds.

It will be readily appreciated by those skilled in the art that that the present invention, through proper selection of pre-treatment chemical, can selectively remove unwanted species from one of the two phases. For example, a mixture containing kerosene and water, where the water phase also contains a dissolved metal, can have that metal removed by pre-treating the mixture with a suitable chelating agent. Further in cases where the feed stream contains insoluble particulates, e.g sand, soil and the like, a pre-treatment by filtering, centrifuging, freezing or cooling, or any combination thereof may be employed to remove such materials.

It will also be appreciated by those skilled in the art that although the invention has been specifically described in terms of the separation of oil and water mixtures, the invention is also applicable to many immiscible organic substances either mixed with or floating on a body of water.

TABLES 1–11

| METHANOL | | | | | |
|---|---|---|---|---|---|
| Class of Surfactant: | | Non-ionic | | | |
| Chemical Family: | | Hydroxyl, Aliphatic | | | |
| Components: | | Methanol (100%) | | | |
| Molecular Formula: | | CH3-OH | | | |
| Molecular Weight: | | 32.04 | | | |
| Caused Water Breakthru: | | Yes | | | |
| % Productivity Change with: | | Methanol | | | |
| % Additive Carrier | 1 | 2 | 3 | 4 | 5 |
| Paraffin | na | na | na | na | na |
| Kerosene | 0 | −2 | −9 | −12 | −15 |
| Hexane | 7 | 4 | 2 | 2 | 1 |

Prosperse 611

Class of Surfactant: Cationic with anionic and nonionic surfactants as crystal modifiers. Normally anionic and cationic surfactants should not be used together because the combination may produce an insoluble precipitate.

| | | | | | |
|---|---|---|---|---|---|
| Product Use: | | Paraffin Inhibitor | | | |
| Chemical Family: | | Polymers in Xylene | | | |
| Components: | | Xylene (60–100%) | | | |
| Solubility: | | Oil: Soluble | | | |
| | | Fresh water: Insoluble | | | |
| | | High TDS Brine: Insoluble | | | |
| Caused Water Breakthru: | | Yes | | | |
| % Productivity Change with: | | Prosperse 611 | | | |
| % Additive Carrier | 1 | 2 | 3 | 4 | 5 |
| Paraffin | 20 | 22 | 22 | 33 | 42 |
| Kerosene | 0 | 0 | −5 | 0 | 0 |
| Hexane | −13 | −14 | −17 | −19 | −19 |

| Sodium Dodecyl Sulfate | | | | | |
|---|---|---|---|---|---|
| Class of Surfactant: | | Anionic | | | |
| Components: | | Sodium Lauryl Sulfate (100%) | | | |
| Molecular Formula: | | CH3(CH2)11SO4Na | | | |
| Molecular Weight: | | 288.2224 | | | |
| Solubility: | | 10% in water | | | |
| Caused Water Breakthru: | | Yes | | | |
| % Productivity Change with: | | Sodium Dodecyl Sulfa | | | |
| % Additive Carrier | 0.3 | 0.6 | 0.9 | 1.2 | 1.5 |
| Paraffin | 0 | 0 | −2 | −8 | −11 |
| Kerosene | −5 | −72 | −84 | −94 | na |
| Hexane | 0 | 1 | −1 | −1 | −1 |

| Cronox 679 NE | | | | | |
|---|---|---|---|---|---|
| Class of Surfactant: | | Cationic | | | |
| Producr Use: | | Corrosion Inhibitor | | | |
| Components: | | Petroleum Distillate (40–70%) | | | |
| | | Isopropanol (7–13%) | | | |
| | | Fatty Acid Imidazoline (15–40%) | | | |
| | | Xylene (10–30%) | | | |
| Caused Water Breakthru: | | Yes | | | |
| % Productivity Change with: | | Cronox 679 NE | | | |
| % Additive Carrier | 1 | 2 | 3 | 4 | 5 |
| Paraffin | −32 | −41 | −51 | −60 | −66 |
| Kerosene | −36 | −47 | −64 | −75 | −83 |
| Hexane | −26 | −30 | −36 | −41 | −47 |

| Waxsol | | | | | |
|---|---|---|---|---|---|
| Class of Surfactant: | | No surfactant chemicals | | | |
| Chemical Family: | | Hydrocarbon mixture | | | |
| Components: | | C7–C14 (100%) | | | |
| Solubility: | | water = very slightly | | | |
| Caused Water Breakthru: | | No | | | |
| % Productivity Change with: | | Waxsol | | | |
| % Additive Carrier | 1 | 2 | 3 | 4 | 5 |
| Paraffin | 1 | 2 | 3 | 3 | 8 |
| Kerosene | −5 | −4 | −6 | −2 | −2 |
| Hexane | −21 | −21 | −21 | −26 | −23 |

| Calnox | |
|---|---|
| Class of Surfactant: | Anionic |
| Product Use: | Scale Inhibitor |

-continued

| Chemical Family: | Phosphonate (PO3) |
| --- | --- |
| Components: | Ethylene Glycol (35%) |
|  | Methanol (10%) |
| Caused Water Breakthru: | No |
| % Productivity Change with: | Calnox |

| % Additive Carrier | 1 | 2 | 3 | 4 | 5 |
| --- | --- | --- | --- | --- | --- |
| Paraffin | 0 | 6 | −8 | −5 | −4 |
| Kerosene | −9 | −16 | −23 | −27 | −28 |
| Hexane | −30 | −28 | −30 | −26 | −30 |

Cronox MEP 426

| Class of Surfactant: | Cationic |
| --- | --- |
| Product Use: | Biocide, Corrosion Inhibitor, Oxygen Scavenger |
| Components: | Alkyl amine acetate (3–7%) |
|  | Oxyalkylate amine (3–7%) |
|  | Alkyl arly amine (5–10%) |
|  | Isopropanol (7–13%) |
|  | Petroleum Distillates (3–7%) |
|  | Methanol (10–30%) |
|  | Ethylene Glycol (3–7%) |
|  | 2-Butoxyethanol (7–13%) |
|  | Ammonium Bisulphite (3–7%) |
| Solubility: | Water soluble |
| Caused Water Breakthru: | No |
| % Productivity Change with: | Cronox MEP 426 |

| % Additive Carrier | 1 | 2 | 3 | 4 | 5 |
| --- | --- | --- | --- | --- | --- |
| Paraffin | 0 | −13 | −24 | −30 | −35 |
| Kerosene | −8 | −35 | −35 | −48 | −50 |
| Hexane | 0 | 2 | 0 | 0 | −6 |

Aquanox EB-8814

| Class of Surfactant: | Nonionic |
| --- | --- |
| Product Use: | Demulsifier |
| Chemical Family: | Polyoxylated Phenolic Resin, Sulphonate |
| Components: | Ispropanol (>5%) |
|  | Xylene (55%) |
| Caused Water Breakthru: | No |
| % Productivity Change with: | Aquanox |

| % Additive Carrier | 1 | 2 | 3 | 4 | 5 |
| --- | --- | --- | --- | --- | --- |
| Paraffin | 5 | 2 | 2 | 2 | 2 |
| Kerosene | −1 | −1 | −51 | −58 | −78 |
| Hexane | −1 | −1 | −25 | −40 | −50 |

BRIJ35

| Class of Surfactant: | Nonionic (Polyethylene Oxide, Polypropylene Oxide) |
| --- | --- |
| Components: | Lauryl Polyethylene Glycol Ether (100%) |
| Molecular Formula: | C12H25(OCH2CH2)23OH |
| Molecular Weight: | 1198.8116 |
| Solubility: | water soluble |
| Caused Water Breakthru: | Yes |
| % Productivity Change with: | BRIJ35 |

| % Additive Carrier | 1 | 2 | 3 | 4 | 5 |
| --- | --- | --- | --- | --- | --- |
| Paraffin | 8 | 0 | −11 | −16 | −16 |
| Kerosene | −22 | −48 | −62 | −62 | −64 |
| Hexane | 0 | 0 | 0 | 6 | 9 |

Isopropanol

| Class of Surfactant: | Non-ionic |
| --- | --- |
| Components: | Isopropanol (70–99%) |
| Molecular Formula: | CH3CH-OHCH3 |
| Caused Water Breakthru: | No |

-continued

| % Productivity Change with: | Isopropanol | | | | |
| --- | --- | --- | --- | --- | --- |
| % Additive Carrier | 1 | 2 | 3 | 4 | 5 |
| Paraffin | na | na | na | na | na |
| Kerosene | −4 | 1 | −1 | 1 | −3 |
| Hexane | 0 | 0 | 0 | 0 | 0 |

A quantity of asphaltine was also obtained. The same tests were run as above, although the actual amount of this material that was truly put into solution is questionable.

| % Productivity Change with: Asphaltines | | | | | |
| --- | --- | --- | --- | --- | --- |
| % Additive Carrier | 0.01 | 0.03 | 0.16 | 0.23 | 0.53 |
| Paraffin | na | na | na | −21 | −24 |
| Kerosene | 11 | −3 | na | na | na |
| Hexane | −6 | −6 | −6 | −6 | na |

I claim:

1. A method for separating a mixture containing an aqueous liquid phase and an immiscible organic phase, into a substantially organic-free aqueous phase and a substantially aqueous-free organic phase, comprising
    a) providing a plurality of hollow hydrophobic fibres having micropores therein and having exposed ends inaccessible to the mixture, the micropores extending from an outside surface of each fibre to a hollow interior portion thereof,
    b) pressurising the mixture in a controlled low shear manner to minimise emulsification of the organic and aqueous phases, such that the mixture is under higher pressure relative to the hollow interior of the fibres to provide a pressure differential between the mixture and the hollow interior of the fibres,
    c) contacting the fibres with the pressurised mixture, the pressure differential being sufficient to permit passage through the micropores of the immiscible organic phase, but insufficient to allow passage through the micropores of the aqueous phase, and for the fibres to collapse,
    d) collecting the substantially organic-free aqueous phase, and
    e) collecting the substantially free aqueous-free organic phase.

2. A method according to claim 1, wherein before step c), including the additional step of heating the mixture to a temperature in the range of 30–70° C.

3. A method according to claim 1, wherein the differential pressure is in a range of a pressure differential which provides a flux, up to the breakthrough pressure at which the aqueous phase will pass through the micropores.

4. A method for separating a mixture containing an aqueous phase and an immiscible organic phase which contains large organic particulates, into a substantially organic-free aqueous phase and a substantially aqueous-free organic phase, comprising
    a) providing a plurality of hollow hydrophobic fibres having micropores therein and having exposed ends inaccessible to the mixture, the micropores extending from an outside surface of each fibre to a hollow interior portion thereof, b) treating the mixture to reduce the particle size of the organic particulates to a size equal to or less than the pore size of the fibre, c) pressurising the mixture in a controlled low shear manner to minimise emulsification of the organic and aqueous phases, such that the mixture is under higher pressure relative to the hollow interior of the fibres to provide a pressure differential between the mixture and the hollow interior of the fibres, d) contacting the fibres with the pressurised mixture, the pressure differential being sufficient to permit passage through the micropores of the immiscible organic phase, but insufficient to allow passage through the micropores of the aqueous phase, and for the fibres to collapse, e) collecting the substantially organic-free aqueous phase, and f) collecting the substantially free aqueous-free organic phase.

5. A method according to claim 4, wherein the treatment is selected from the group consisting of i) heating the mixture to a temperature above the particle size shift temperature of the organic particulates, but below the operating temperature limit of the fibre material, ii) adding a demulsifier to the mixture, and iii) both heating the mixture as in i) and adding a demulsifier as in ii).

6. A method according to claim 5, wherein the treatment is treatment i) and the temperature is in a range of 30–70° C.

7. A method according to claim 4, wherein a diluent is added to the mixture before step c).

8. A method according to claim 4, wherein the micropores have a pore diameter of 0.03 to 5.0 microns.

9. A method according to claim 8, wherein the micropores have a pore diameter of 0.1 to 0.2 microns.

10. A method according to claim 4, wherein the pressure differential is in a range of a pressure differential which provides a flux, up to the breakthrough pressure at which the aqueous phase will pass through the micropores.

11. A method according to claim 10, wherein the pressure differential is in a range of 20–40 psi.

12. A method according to claim 4, wherein the method is continuous.

13. A method according to claim 4, wherein the organic phase comprises an oil, and the aqueous phase comprises water.

14. A method for separating a mixture containing an aqueous liquid and an immiscible organic phase, comprising, a) providing a plurality of hollow hydrophobic fibres having micropores therein and having exposed ends inaccessible to the mixture, the micropores extending from an outside surface of each fibre to a hollow interior portion thereof, b) pressurising the mixture in a controlled low shear manner to minimise emulsification of the organic and aqueous phases, such that the mixture is under higher pressure relative to the hollow interior of the fibres to provide a pressure differential between the mixture and the hollow interior of the fibres, c) contacting the fibres with the pressurised mixture, the pressure differential being sufficient to permit passage through the micropores of the immiscible organic phase, but insufficient to allow passage through the micropores of the aqueous phase, and for the fibres to collapse, d) collecting a substantially organic-free aqueous phase as a first product stream, e) collecting a substantially aqueous-free organic phase as a second product stream and, f) collecting as a third product stream, which has not passed through the micropores, a stream comprising an organic phase containing <0–5% of water.

15. A method according to claim 14, wherein before step c), including the additional step of heating the mixture to a temperature in the range of 30–70° C.

16. A method according to claim 15, wherein the temperature is in the range of 50–55° C.

17. A method according to claim 14, wherein a diluent is added to the mixture before step c).

18. A method according to claim 14, wherein the micropores have a diameter in the range of 0.03–5.0 microns.

19. A method according to claim 18, wherein the micropores have a diameter in the range of 0.1–0.2 microns.

20. A method according to claim 14, wherein the differential pressure is in a range of a pressure differential which provides a flux, up to the breakthrough pressure at which the aqueous phase will pass through the micropores.

21. A method according to claim 20, wherein the pressure differential is in a range of 20–40 psi.

22. A method according to claim 14, wherein flow control is provided by controlling the flow of the third product stream.

23. A method according to claim 14, including the additional step of adding the third product stream to the second product stream.

24. A method according to claim 14, wherein the method is continuous.

25. A method according to claim 14, wherein the organic phase comprises an oil and the aqueous phase comprises water.

26. An apparatus for separating a mixture containing an aqueous liquid and an immiscible organic phase, comprising, a) microporous hydrophobic hollow fibre means, the fibres having micropores therein and having exposed ends inaccessible to the mixture, the micropores extending from an outside surface of each fibre to a hollow interior portion thereof, b) means for pressurising the mixture in a controlled low shear manner to minimise emulsification of the organic and aqueous phases to provide a feed steam which is under higher pressure relative to the hollow interior of the fibres to provide a pressure differential between the mixture and the hollow interior of the fibres, such that when the fibres are contacted with the pressurised mixture, the pressure differential being sufficient to permit passage through the micropores of the immiscible organic phase, but insufficient to allow passage through the micropores of the aqueous phase, and for the fibres to collapse, c) means for collecting as a first product stream which has not passed through the micropores, a substantially organic-free aqueous phase, and d) means for collecting as a second product stream which has passed through the micropores, a substantially aqueous-free organic phase.

27. An apparatus according to claim 26, additionally comprising means for collecting as a third product stream which has not passed through the micropores, an organic phase containing <0.5% of an aqueous liquid.

28. An apparatus according to claim 27, additionally comprising means for controlling product flow, provided in association with the third product stream.

29. An apparatus according to claim 26, additionally comprising heating means, provided in association with the feed stream.

30. An apparatus according to claim 26, including support means for supporting the fibres in the form of a bundle.

31. An apparatus according to claim 26, wherein the means for pressurising the mixture is a low shear pump.

32. An apparatus according to claim 26, wherein the pore diameter of the micropores is in the range of 0.1–0.2 microns.

* * * * *